US012623599B2

(12) United States Patent
Aldighieri et al.

(10) Patent No.: US 12,623,599 B2
(45) Date of Patent: May 12, 2026

(54) TECHNIQUES FOR UTILIZING ARTIFICIAL INTELLIGENCE TO IDENTIFY VULNERABLE PEDESTRIAN BEHAVIOR

(71) Applicant: FCA US LLC, Auburn Hills, MI (US)

(72) Inventors: Paul A Aldighieri, Auburn Hills, MI (US); Matthew A Taylor, Auburn Hills, MI (US); Shahin Nobari-Tabrizi, Auburn Hills, MI (US); Ethan E Bayer, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 28 days.

(21) Appl. No.: 18/755,794

(22) Filed: Jun. 27, 2024

(65) Prior Publication Data

US 2026/0001483 A1     Jan. 1, 2026

(51) Int. Cl.
*B60Q 9/00* (2006.01)
*G06V 20/58* (2022.01)
*G07C 5/04* (2006.01)

(52) U.S. Cl.
CPC ............. *B60Q 9/008* (2013.01); *G06V 20/58* (2022.01); *G07C 5/04* (2013.01)

(58) Field of Classification Search
CPC ........... B60Q 9/008; G06V 20/58; G07C 5/04
See application file for complete search history.

(56) References Cited

U.S. PATENT DOCUMENTS 7,493,202 B2     2/2009 Demro et al.
7,954,587 B2     6/2011 Kisanuki et al.
10,832,593 B1 *  11/2020 Dahl .................... G09B 19/167

11,017,661 B1 *  5/2021 Beauchamp ............ H04W 4/44
11,062,606 B2 *  7/2021 Beauchamp ........... G08G 1/166
11,230,297 B2 *  1/2022 Zhu ........................ G06V 20/58
11,897,405 B2    2/2024 Umezawa et al.
2013/0124052 A1  5/2013 Hahne
2016/0075332 A1 * 3/2016 Edo-Ros ........... B60W 30/0956
                                                 701/70

(Continued)

FOREIGN PATENT DOCUMENTS

CN        116749868 A      9/2023

*Primary Examiner* — Peter D Nolan
*Assistant Examiner* — Demetra R Smith-Stewart
(74) *Attorney, Agent, or Firm* — Jeremy J. Klobucar

(57)          ABSTRACT

A control system of a vehicle detects a close-call vehicle-pedestrian encounter where the vehicle and a nearby object of concern almost collide and cause and accident, collects data for a previous period before the detected close-call vehicle-pedestrian encounter, the collected data including data captured by a set of perception sensors of the vehicle during the previous period, and transmits the collected data to a computing server configured to train a vehicle-pedestrian encounter model based on the collected data. The computing server then receives vehicle information indicative of a current state of the vehicle and executes the trained vehicle-pedestrian encounter model using the vehicle information to predict a future potential vehicle-pedestrian encounter and transmits encounter information indicative of the future potential vehicle-pedestrian encounter to the control system, which selectively generates an alert indicative of the future potential vehicle-pedestrian encounter for a driver of the vehicle.

20 Claims, 3 Drawing Sheets

(56)     References Cited

U.S. PATENT DOCUMENTS

| | | | |
|---|---|---|---|
| 2020/0041997 A1* | 2/2020 | Tuukkanen ............ | A61B 5/024 |
| 2020/0079371 A1 | 3/2020 | Sakamoto et al. | |
| 2021/0312795 A1* | 10/2021 | Schonfeld .............. | G08G 1/012 |
| 2022/0101019 A1* | 3/2022 | Cohen .................... | G06V 20/56 |
| 2022/0326042 A1* | 10/2022 | Jeon ................... | G01C 21/3848 |
| 2023/0095384 A1* | 3/2023 | Sharma Banjade ......................... | G08G 1/096725 |
| | | | 701/301 |
| 2024/0280988 A1* | 8/2024 | Dean .................... | G05D 1/0255 |

* cited by examiner

TECHNIQUES FOR UTILIZING ARTIFICIAL INTELLIGENCE TO IDENTIFY VULNERABLE PEDESTRIAN BEHAVIOR

FIELD

The present application generally relates to vehicle artificial intelligence (AI) and, more particularly, to techniques for utilizing AI to identify vulnerable pedestrian behavior.

BACKGROUND

Vehicles and their drivers may experience many "close call" encounters over time where an accident or collision by the vehicle with a pedestrian or another object almost occurs. Each of these "close call" encounters is preceded by an event where nearby objects of concern (pedestrians, animals, other vehicles, etc.) risked entering or did enter the pathway of the vehicle in a careless or otherwise unexpected manner. Conventional solutions to this problem include evasive or responsive vehicle features, such as automated emergency braking (AEB) and forward collision warning (FCW) or avoidance. These evasive features are reactive in that they are engaged immediately before a concern unfolds and thus they do not predict and proactively alert the driver or prime their attention to a potentially upcoming concern. Accordingly, while such conventional encounter avoidance systems for vehicles do work well for their intended purpose, there exists an opportunity for improvement in the relevant art.

SUMMARY

According to one aspect of the invention, a vehicle-pedestrian encounter prediction system for a vehicle is presented. In one exemplary implementation, the vehicle-pedestrian encounter prediction system comprises a computing server associated with an original equipment manufacturer (OEM) of a plurality of OEM vehicles including the vehicle a control system of the vehicle, the control system being configured to detect a close-call vehicle-pedestrian encounter where the vehicle and a nearby object of concern almost collide and cause and accident, collect data for a previous period before the detected close-call vehicle-pedestrian encounter, the collected data including data captured by a set of perception sensors of the vehicle during the previous period, transmit, to the computing server, the collected data, wherein the computing server is configured to train a vehicle-pedestrian encounter model based on the collected data, transmit, to the computing server, vehicle information indicative of a current state of the vehicle, wherein the computing server is further configured to execute the trained vehicle-pedestrian encounter model using the vehicle information to predict a future potential vehicle-pedestrian encounter, receive, from the computing server, encounter information indicative of the future potential vehicle-pedestrian encounter, and selectively generate an alert indicative of the future potential vehicle-pedestrian encounter for a driver of the vehicle.

In some implementations, the set of perception sensors includes a camera system and the collected data includes a video feed captured by the camera system. In some implementations, the set of perception sensors further includes a location information system and the collected data includes a location of the vehicle and a time and date of the close-call vehicle-pedestrian encounter. In some implementations, the computing server is further configured to analyze the collected data to verify or discard the close-call vehicle-pedestrian encounter. In some implementations, the computing server is configured to train the vehicle-pedestrian encounter model based the collected data when the close-call vehicle-pedestrian encounter is verified.

In some implementations, the control system is configured to automatically detect the close-call vehicle-pedestrian encounter when an evasive feature of the vehicle is engaged. In some implementations, the control system is configured to detect the close-call vehicle-pedestrian encounter based on input from the driver of the vehicle. In some implementations, the vehicle information comprises at least a current location of the vehicle and a current time and date, and wherein the encounter information includes a likelihood and a type of the future potential vehicle-pedestrian encounter. In some implementations, the control system is configured to generate the alert when the likelihood exceeds a likelihood threshold and the alert is based on the type of the future potential vehicle-pedestrian encounter. In some implementations, the alert comprises at least one of a visual alert, an audio alert, and a haptic alert.

According to another aspect of the invention, a vehicle-pedestrian encounter prediction method for a vehicle is presented. In one exemplary implementation, the vehicle-pedestrian encounter prediction method comprises detecting, by a control system of the vehicle, a close-call vehicle-pedestrian encounter where the vehicle and a nearby object of concern almost collide and cause and accident, collecting, by the control system, data for a previous period before the detected close-call vehicle-pedestrian encounter, the collected data including data captured by a set of perception sensors of the vehicle during the previous period, transmitting, by the control system and to a computing server, the collected data, wherein the computing server is associated with an OEM of a plurality of OEM vehicles including the vehicle and is configured to train a vehicle-pedestrian encounter model based on the collected data, transmitting, from the control system and to the computing server, vehicle information indicative of a current state of the vehicle, wherein the computing server is further configured to execute the trained vehicle-pedestrian encounter model using the vehicle information to predict a future potential vehicle-pedestrian encounter, receiving, by the control system and from the computing server, encounter information indicative of the future potential vehicle-pedestrian encounter, and selectively generating, by the control system, an alert indicative of the future potential vehicle-pedestrian encounter for a driver of the vehicle.

In some implementations, the set of perception sensors includes a camera system and the collected data includes a video feed captured by the camera system. In some implementations, the set of perception sensors further includes a location information system and the collected data includes a location of the vehicle and a time and date of the close-call vehicle-pedestrian encounter. In some implementations, the computing server is further configured to analyze the collected data to verify or discard the close-call vehicle-pedestrian encounter. In some implementations, the computing server is configured to train the vehicle-pedestrian encounter model based the collected data when the close-call vehicle-pedestrian encounter is verified.

In some implementations, the detecting of the close-call vehicle-pedestrian encounter comprises automatically detecting, by the control system, the close-call vehicle-pedestrian encounter when an evasive feature of the vehicle is engaged. In some implementations, the detecting of the close-call vehicle-pedestrian encounter is based on input from the driver of the vehicle. In some implementations, the vehicle information comprises at least a current location of the vehicle and a current time and date, and wherein the encounter information includes a likelihood and a type of the future potential vehicle-pedestrian encounter. In some implementations, the generating of the alert is performed when the likelihood exceeds a likelihood threshold and the alert is based on the type of the future potential vehicle-pedestrian encounter. In some implementations, the alert comprises at least one of a visual alert, an audio alert, and a haptic alert.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional solutions to the problem of potential vehicle-pedestrian encounters include evasive vehicle features, such as automated emergency braking (AEB), forward collision warning (FCW), and any other similar collision avoidance features. These evasive features are reactive in that they are engaged immediately before a potential collision concern unfolds and thus they do not predict and proactively alert the driver or prime their attention to future potential collision concerns. Accordingly, improved vehicle-pedestrian encounter prediction and vehicle control systems and methods are presented herein. The term "vehicle-pedestrian encounter" as used herein refers to potential encounters (i.e., physical collision) between vehicles and pedestrians as well as potential encounters between vehicles and other nearby non-pedestrian objects of interest (animals, other vehicles, structures, etc.).

These techniques train a vehicle-pedestrian encounter machine learning model (e.g., a neural network type model) based on collected data from a plurality of original equipment manufacturer (OEM) vehicles. Each of these OEM vehicles collects and reports data relating to experienced "close call" encounters to a remote computing server associated with the OEM. The computing server analyzes the received data and, based on this analysis, either verifies or discards each close-call encounter. The computing server then trains the vehicle-pedestrian encounter model based on the collected data for each verified close-call" encounter. The term "close-call" as used herein refers to a near-miss or a vehicle-pedestrian encounter that almost occurred but was averted. The trained vehicle-pedestrian encounter model is then utilized to proactively predict potential future vehicle-pedestrian encounters and provide driver alert(s).

Figure 1:
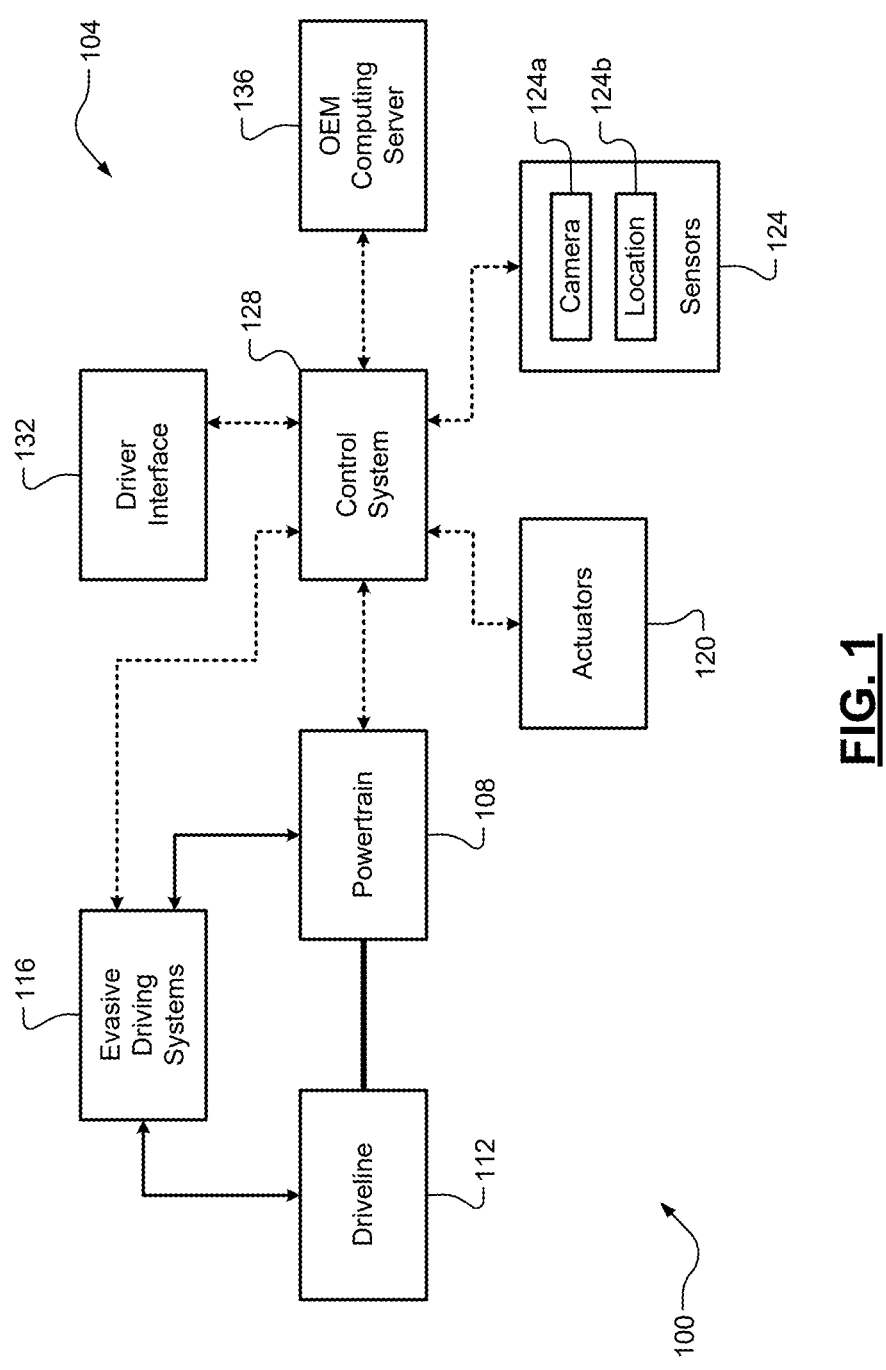
FIG. 1 is a functional block diagram of a vehicle having an example vehicle-pedestrian encounter prediction system according to the principles of the present application.

Referring now to FIG. 1, a functional block diagram of a vehicle 100 having an example vehicle-pedestrian encounter system 104 according to the principles of the present application is illustrated. The vehicle 100 generally comprises a powertrain 108 configured to generate and transfer drive torque to a driveline 112 for vehicle propulsion. It will be appreciated that the vehicle 100 could be any suitable type of vehicle having any suitable type of powertrain (a conventional engine-only vehicle, mild or plug-in hybrid-electric vehicle (PHEV), an electric-only or battery electric vehicle (BEV), etc.). The vehicle 100 comprises a set of evasive driving systems 116. Each evasive driving system 116 is configured to perform a reactive evasive automated driver-assistance system (ADAS) or autonomous driving feature. Non-limiting examples of the set of evasive driving systems 116 include AEB, FCW, and collision avoidance.

The vehicle 100 includes a plurality of actuators 120 configured to actuate specific components of the vehicle 100 and, more particularly, the powertrain 108 or the driveline 112. Non-limiting examples of these actuators 120 include an accelerator/throttle actuator, a brake actuator, a steering actuator, and alert actuator(s) (a display/light, a speaker, a haptic vibrator, etc.). It will be appreciated that there can be some overlap between the plurality of actuators 120 and the set of evasive driving systems 116. The vehicle 100 also includes a plurality of perception sensors 124 (also "sensors 124") configured to measure operating parameters of the vehicle 100. Non-limiting examples of these sensors include perception sensors, such as a camera system 124a, a location information system 124b, and other parameters measuring/monitoring sensors (positions, speeds, and/or accelerations, pressures, temperatures, electrical circuit parameters, etc.).

A control system 128 controls operation of the vehicle 100 and receives input from the perception sensors 124 and controls the actuators 120. The control system 128, for example, controls the powertrain 108 to generate a desired amount of drive torque to satisfy a driver torque request provided by a driver of the vehicle 100 via a driver interface 132 (e.g., an accelerator pedal). At least some of the evasive driving system(s) 116 could be implemented as software at the control system 128. The control system 128 is also configured to communicate (e.g., via a cellular or satellite data network) with a remote OEM computing server 136 (also, "computing server 136") associated with the same OEM as the vehicle 100. The control system 128 and the computing server 136 are both configured to execute portions of the vehicle-pedestrian encounter prediction techniques of the present application, which will now be described in greater detail.

Figure 2:
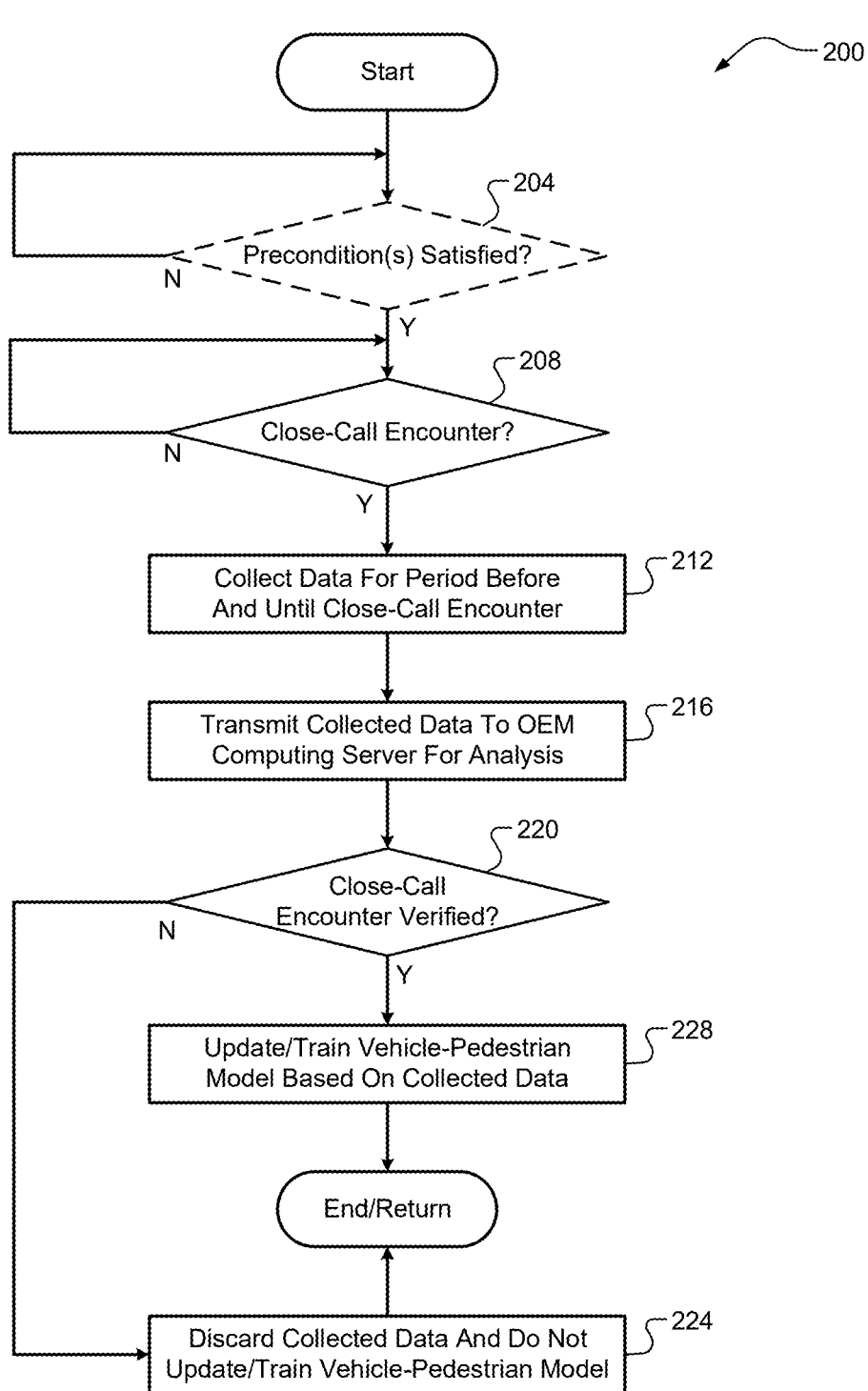
FIG. 2 is a flow diagram of an example method of detecting and verifying vehicle-pedestrian encounters and training a vehicle-pedestrian encounter model according to the principles of the present application.

Referring now to FIG. 2 and with continued reference to FIG. 1, a flow diagram of an example method 200 of detecting and verifying vehicle-pedestrian encounters and training a vehicle-pedestrian encounter model according to the principles of the present application is illustrated. While the method 200 specifically references the vehicle 100 and the computing server 136 for descriptive/illustrative purposes, it will be appreciated that the method 200 could be applicable to any suitable vehicles and remote servers associated with a particular OEM. The method 200 begins at 204. At optional 204, the control system 128 determines whether an optional set of one or more preconditions are satisfied. Non-limiting examples of these preconditions include the vehicle 100 being powered up and running and there being no malfunctions or faults present that would negatively impact or otherwise inhibit the operation of the method 200. When false, the method 200 ends or returns to 204. When true, the method 200 proceeds to 208.

At 208, the control system 128 determines whether a close-call vehicle-pedestrian encounter has occurred. As previously discussed, this close-call vehicle-pedestrian encounter represents a near-miss of a vehicle-pedestrian encounter, e.g., that almost occurred but was averted. When false, the method 200 returns to 204 and continued monitoring until a close-call vehicle-pedestrian encounter is detected. When true, the method 200 proceeds to 212. At 212, the control system 128 collects data for a period (e.g., a predetermined or preset period, such as 10-15 seconds) before and until the close-call vehicle-pedestrian encounter occurred. This could include, for example only, a video stream captured by the camera system 124a during the period and other useful information, such as a time and date of the close-call vehicle-pedestrian encounter. It will be appreciated that the collected data could also include any other suitable data for training of the vehicle-pedestrian encounter machine learning model as described in greater detail below.

For illustrative/descriptive purposes, two example close-call vehicle-pedestrian encounter scenarios will be described. It will be appreciated that these are merely example scenarios and are not intended to limit the scope of the techniques of the present application. In a first example scenario, the vehicle 100 is operating in an area at night on a busy holiday, such as New Year's Eve. Due to the particular time of year (i.e., a holiday) and the particular time of day (i.e., at night), there may be a large number of pedestrians walking about in a rural (e.g., downtown) area, such as a city restaurant or bar district. While operating, the vehicle 100 narrowly averts a collision with a pedestrian that is walking across the street even though the vehicle 100 has the right-of-way. In this scenario, AEB of the vehicle 100 is automatically engaged to stop the vehicle 100 and avoid the collision with the pedestrian. The video feed and other data (e.g., time/date) are collected for automated (i.e., non-manual) verification of the close-call vehicle-pedestrian encounter. This could be determined automatically by the vehicle 100 without any input or verification by the operator/driver. For example, a degree of braking and/or steering exceeding a calibratable threshold could be indicative of a "close-call" vehicle-pedestrian encounter.

In a second example, the vehicle 100 is operating in an area near a professional football stadium on a weekend afternoon. Due to the particular time of year (e.g., the fall), the particular time of week (e.g., a weekend, or a Sunday), and the particular time of day (e.g., in the afternoon), there may be a large number of pedestrians (e.g., football fans) in the area nearby a stadium hosting the professional football game. While operating, the vehicle 100 narrowly averts a collision with a pedestrian that is walking across the street even though the vehicle 100 has the right-of-way. In this scenario, none of the evasive driving systems 116 are automatically engaged, but the driver manually applies the brakes to stop the vehicle 100 and avert the collision. The driver is automatically prompted to answer whether a close-call vehicle-pedestrian encounter occurred (e.g., yes or no), or the driver manually inputs via the driver interface 132 that a close-call vehicle-pedestrian encounter occurred. As previously discussed, manual (human-based) verification of a potential close-call encounter could not be used and instead automated/automatic detection of close-call encounters. The video feed and other data (e.g., time/date) are collected for verification of the close-call vehicle-pedestrian encounter.

At 216, the control system 128 transmits the collected data to the computing server 136 for analysis. Upon receipt, the computing server 136 analyzes the collected data (e.g., the video stream) at 220 to verify that the close-call vehicle-pedestrian encounter did occur. If the close-call vehicle-pedestrian encounter is not verified, the collected data is discarded at 224 and the method 200 ends. When verified, however, the method 200 proceeds to 228 where the computing server 136 updates or trains the vehicle-pedestrian encounter model based on the collected data. This include, for example, associating pedestrian behaviors with the particular location and time/date of the close-call vehicle-pedestrian encounter. It will be appreciated that a plurality of other OEM vehicles could also be providing collected data for their close-call vehicle-pedestrian encounters, thereby increasing the amount of collected data for better training of the vehicle-pedestrian encounter model and improved prediction performance. The method 200 then ends or returns to 204 for one or more additional cycles.

Figure 3:
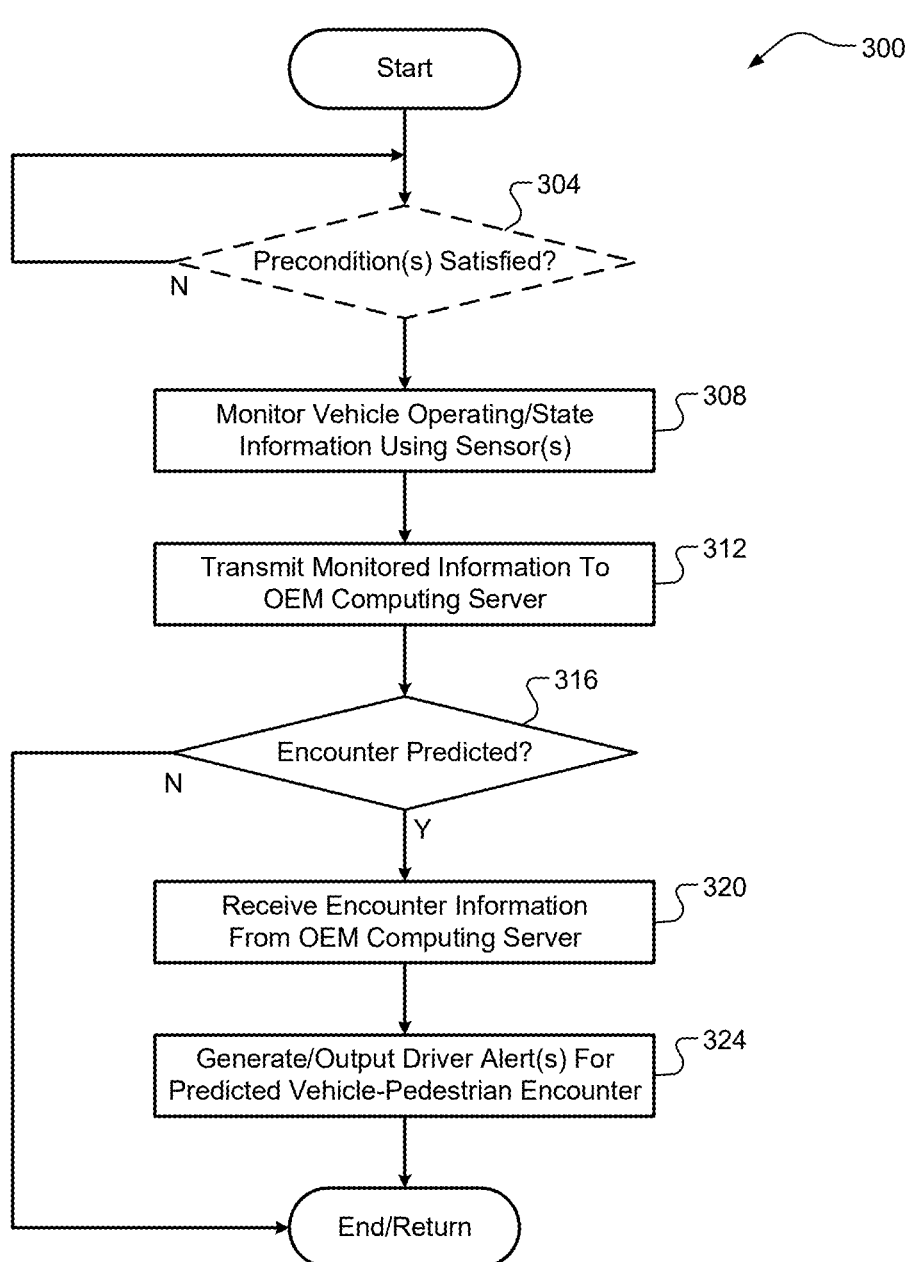
FIG. 3 is a flow diagram of an example method for predicting a future vehicle-pedestrian encounter and alerting a driver of a vehicle according to the principles of the present application.

Referring now to FIG. 3, a flow diagram of an example method 300 for predicting a future vehicle-pedestrian encounter and alerting a driver of a vehicle according to the principles of the present application is illustrated. Again, while the method 300 specifically references the vehicle 100 and the computing server 136 for descriptive/illustrative purposes, it will be appreciated that the method 300 could be applicable to any suitable vehicles and remote servers associated with a particular OEM. The method 300 begins at 304. At optional 304, the control system 128 determines whether an optional set of one or more preconditions are satisfied. Non-limiting examples of these preconditions include the vehicle 100 being powered up and running and there being no malfunctions or faults present that would negatively impact or otherwise inhibit the operation of the method 300. When false, the method 300 ends or returns to 304. When true, the method 300 proceeds to 308.

At 308, the control system 128 monitors current vehicle information indicative of a current state of the vehicle 100 (e.g., current operating parameters of the vehicle 100). This could include, for example only, the geo-location of the vehicle 100, the current time/date, and other operating parameters/states (vehicle speed, weather conditions, etc.). At 312, the control system 128 transmits the vehicle information to the computing server 136. At 316, the computing server 136 executes the trained vehicle-pedestrian encounter model using the vehicle information as input to predict a potential future vehicle-pedestrian encounter. This could include, for example, the model generating a likelihood score indicating a likelihood (e.g., a probability or percentage) that a particular type of vehicle-pedestrian encounter (a vehicle-human or vehicle-pedestrian collision, a vehicle-animal collision, a vehicle-stricture collision, etc.) is likely to occur in the future.

At 320, the control system 128 receives encounter information from the computing server 136. This encounter information is indicative of the future potential vehicle-pedestrian encounter. For example, as discussed above, this encounter information could include a probability or likelihood that particular type of vehicle-pedestrian encounter is going to occur in the future. The encounter information could also include any other pertinent information that could be used by the vehicle 100 in warning or raising the driver's alertness level in anticipation of the potential future vehicle-pedestrian collision. This could include, for example, the geo-location or area (e.g., a geo-fence or array of geo-locations) and a time/day where the vehicle-pedestrian encounter is predicted to occur. At 324, the control system 128 uses this encounter information to generate an alert (e.g., visual, audio, haptic, or some combination thereof) indicative of the future potential vehicle-pedestrian encounter for a driver of the vehicle 100. This could be, for example, when the likelihood or probability exceeds a respective threshold value indicative of a high likelihood of the vehicle-pedestrian encounter occurring. The method 300 then ends or returns to 304 for one or more additional cycles.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle-pedestrian encounter prediction system for a vehicle, the vehicle-pedestrian encounter prediction system comprising:
 a computing server associated with an original equipment manufacturer (OEM) of a plurality of OEM vehicles including the vehicle; and
 a control system of the vehicle, the control system being configured to:
  detect a close-call vehicle-pedestrian encounter where the vehicle and a nearby object of concern almost collide and cause and accident;
  in response to detecting the close-call vehicle-pedestrian encounter:
  collect data for a previous period before the detected close-call vehicle-pedestrian encounter, the collected data including data captured by a set of perception sensors of the vehicle during the previous period; and
  transmit, to the computing server, the collected data, wherein the computing server is configured to train a vehicle-pedestrian encounter model based on the collected data;
  transmit, to the computing server, vehicle information indicative of a current state of the vehicle, wherein the computing server is further configured to execute the trained vehicle-pedestrian encounter model using the vehicle information to predict a future potential vehicle-pedestrian encounter;
  receive, from the computing server, encounter information indicative of the future potential vehicle-pedestrian encounter; and
  selectively generate an alert indicative of the future potential vehicle-pedestrian encounter for a driver of the vehicle.

2. The vehicle-pedestrian encounter prediction system of claim 1, wherein the set of perception sensors includes a camera system and the collected data includes a video feed captured by the camera system, and wherein the collected data includes the video feed for the previous period.

3. The vehicle-pedestrian encounter prediction system of claim 2, wherein the set of perception sensors further includes a location information system and the collected data includes a location of the vehicle and a time and date of the close-call vehicle-pedestrian encounter.

4. The vehicle-pedestrian encounter prediction system of claim 2, wherein the computing server is further configured to analyze the collected data to verify or discard the close-call vehicle-pedestrian encounter.

5. The vehicle-pedestrian encounter prediction system of claim 4, wherein the computing server is configured to train the vehicle-pedestrian encounter model based the collected data when the close-call vehicle-pedestrian encounter is verified.

6. The vehicle-pedestrian encounter prediction system of claim 1, wherein the control system is configured to automatically detect the close-call vehicle-pedestrian encounter when an evasive feature of the vehicle is engaged.

7. The vehicle-pedestrian encounter prediction system of claim 1, wherein the control system is configured to detect the close-call vehicle-pedestrian encounter based on input from the driver of the vehicle.

8. The vehicle-pedestrian encounter prediction system of claim 1, wherein the vehicle information comprises at least a current location of the vehicle and a current time and date, and wherein the encounter information includes a likelihood and a type of the future potential vehicle-pedestrian encounter.

9. The vehicle-pedestrian encounter prediction system of claim 8, wherein the control system is configured to generate the alert when the likelihood exceeds a likelihood threshold and the alert is based on the type of the future potential vehicle-pedestrian encounter.

10. The vehicle-pedestrian encounter prediction system of claim 9, wherein the alert comprises at least one of a visual alert, an audio alert, and a haptic alert.

11. A vehicle-pedestrian encounter prediction method for a vehicle, the vehicle-pedestrian encounter prediction method comprising:
 detecting, by a control system of the vehicle, a close-call vehicle-pedestrian encounter where the vehicle and a nearby object of concern almost collide and cause and accident;
 in response to detecting the close-call vehicle-pedestrian encounter:
  collecting, by the control system, data for a previous period before the detected close-call vehicle-pedestrian encounter, the collected data including data captured by a set of perception sensors of the vehicle during the previous period; and
  transmitting, by the control system and to a computing server, the collected data, wherein the computing server is associated with an original equipment manufacturer (OEM) of a plurality of OEM vehicles including the vehicle and is configured to train a vehicle-pedestrian encounter model based on the collected data;
 transmitting, from the control system and to the computing server, vehicle information indicative of a current state of the vehicle, wherein the computing server is further configured to execute the trained vehicle-pedestrian encounter model using the vehicle information to predict a future potential vehicle-pedestrian encounter;

receiving, by the control system and from the computing server, encounter information indicative of the future potential vehicle-pedestrian encounter; and selectively generating, by the control system, an alert indicative of the future potential vehicle-pedestrian encounter for a driver of the vehicle.

12. The vehicle-pedestrian encounter prediction method of claim 11, wherein the set of perception sensors includes a camera system and the collected data includes a video feed captured by the camera system, and wherein the collected data includes the video feed for the previous period.

13. The vehicle-pedestrian encounter prediction method of claim 12, wherein the set of perception sensors further includes a location information system and the collected data includes a location of the vehicle and a time and date of the close-call vehicle-pedestrian encounter.

14. The vehicle-pedestrian encounter prediction method of claim 12, wherein the computing server is further configured to analyze the collected data to verify or discard the close-call vehicle-pedestrian encounter.

15. The vehicle-pedestrian encounter prediction method of claim 14, wherein the computing server is configured to train the vehicle-pedestrian encounter model based the collected data when the close-call vehicle-pedestrian encounter is verified.

16. The vehicle-pedestrian encounter prediction method of claim 11, wherein the detecting of the close-call vehicle-pedestrian encounter comprises automatically detecting, by the control system, the close-call vehicle-pedestrian encounter when an evasive feature of the vehicle is engaged.

17. The vehicle-pedestrian encounter prediction method of claim 11, wherein the detecting of the close-call vehicle-pedestrian encounter is based on input from the driver of the vehicle.

18. The vehicle-pedestrian encounter prediction method of claim 11, wherein the vehicle information comprises at least a current location of the vehicle and a current time and date, and wherein the encounter information includes a likelihood and a type of the future potential vehicle-pedestrian encounter.

19. The vehicle-pedestrian encounter prediction method of claim 18, wherein the generating of the alert is performed when the likelihood exceeds a likelihood threshold and the alert is based on the type of the future potential vehicle-pedestrian encounter.

20. The vehicle-pedestrian encounter prediction method of claim 19, wherein the alert comprises at least one of a visual alert, an audio alert, and a haptic alert.

* * * * *